United States Patent [19]

Piretti et al.

[11] Patent Number: 5,195,670
[45] Date of Patent: Mar. 23, 1993

[54] BICYCLE RACK WITH ADJUSTABLE PIN LOCKING

[75] Inventors: Giancarlo Piretti, Bologna, Italy; Ervin L. Severson, Oregon, Wis.

[73] Assignee: Graber Products, Inc., Green Bay, Wis.

[21] Appl. No.: 565,572

[22] Filed: Aug. 10, 1990

[51] Int. Cl.⁵ .............................................. B60R 9/10
[52] U.S. Cl. ..................... 224/321; 224/314; 224/329; 224/42.03 B; 224/324; 16/324; 16/329; 24/301
[58] Field of Search ......... 224/321, 314, 309, 42.03 B, 224/329, 330, 42.08, 42.44, 318; 211/17, 18, 21, 22; 16/324, 329, 334; 24/300, 301, 698.2; 248/499

[56] References Cited

U.S. PATENT DOCUMENTS

| | | | |
|---|---|---|---|
| 4,085,847 | 4/1978 | Graber | 224/42.03 B |
| 4,182,467 | 1/1980 | Graber | 224/309 |
| 4,216,844 | 8/1980 | Klafs | 16/329 |
| 4,394,948 | 7/1983 | Graber | 224/42.03 B |
| 4,452,385 | 6/1984 | Prosen | 224/42.03 B |
| 4,799,609 | 1/1989 | Castilla | 224/42.07 |
| 4,830,250 | 5/1989 | Newbold et al. | 224/321 |

Primary Examiner—Linda J. Sholl
Attorney, Agent, or Firm—Fuller, Ryan & Hohenfeldt

[57] ABSTRACT

A heavy duty bicycle rack which has angle adjustable support legs, wherein adjustment of the support arms does not require simultaneous adjustment of the legs which support the carrier on the vehicle. The rack includes a heavy duty positive locking mechanism in which locking pin ends are biased into a locking position, thereby selecting the angular position for the bicycle support arms relative to the legs. The locking pins are the ends of handles which can be pulled or withdrawn slightly to release the pins from the locking apertures to afford rotary movement of the support arms. The handles with the locking pin ends are supported in clam shell or cup shaped shells, these shells having apertures which permit relative movement of the handles and pin ends. Springs which bias the handles toward the locking position are confined in the cup shaped shells. A bolt secures each pair of shells, one support arm and brackets on each of the support frames together in assembly. The rack is secured to the vehicle by means of straps which hook onto surfaces of the vehicle, such as the trunk lid, by means of reversible hooks.

9 Claims, 2 Drawing Sheets

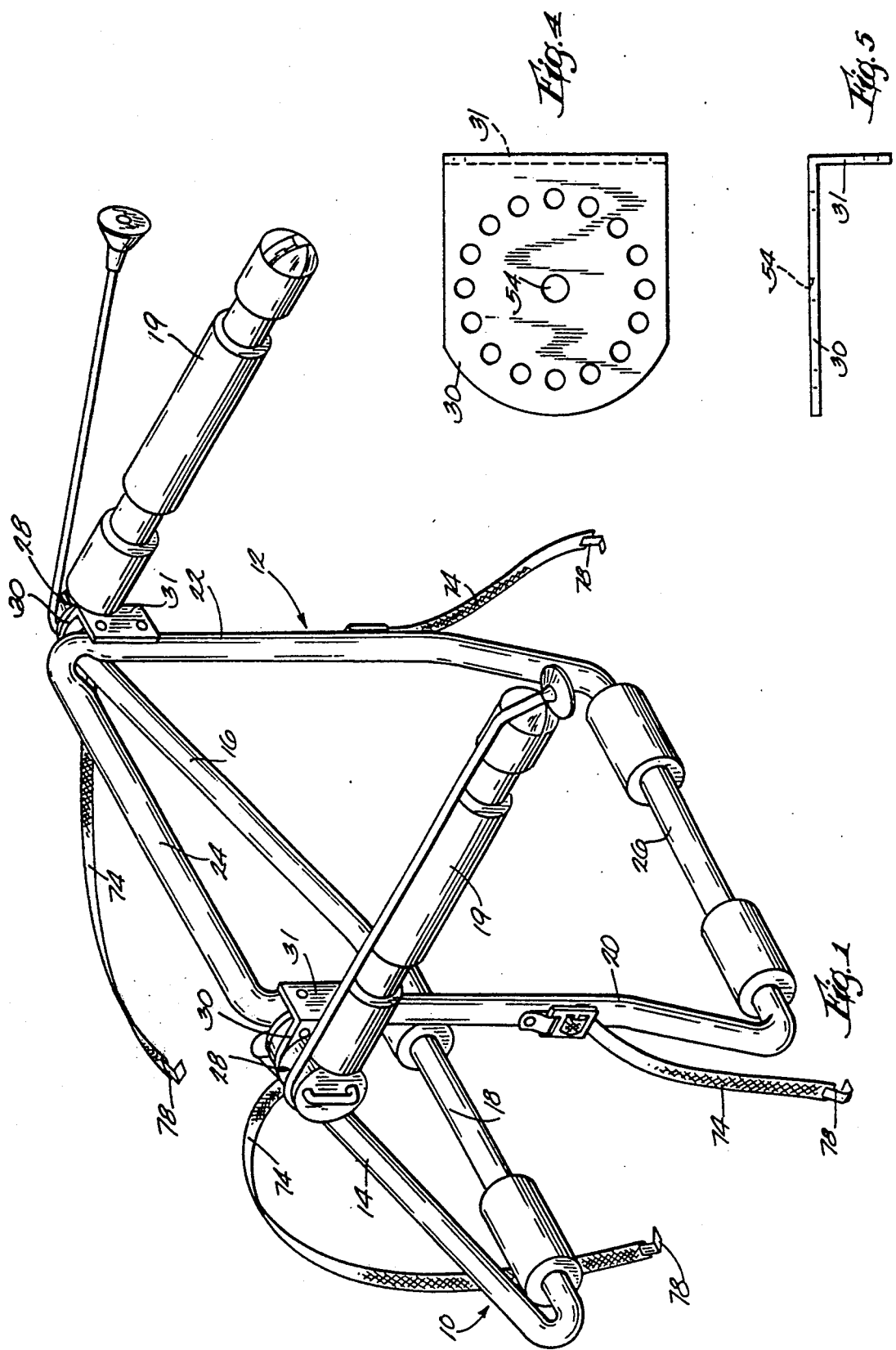

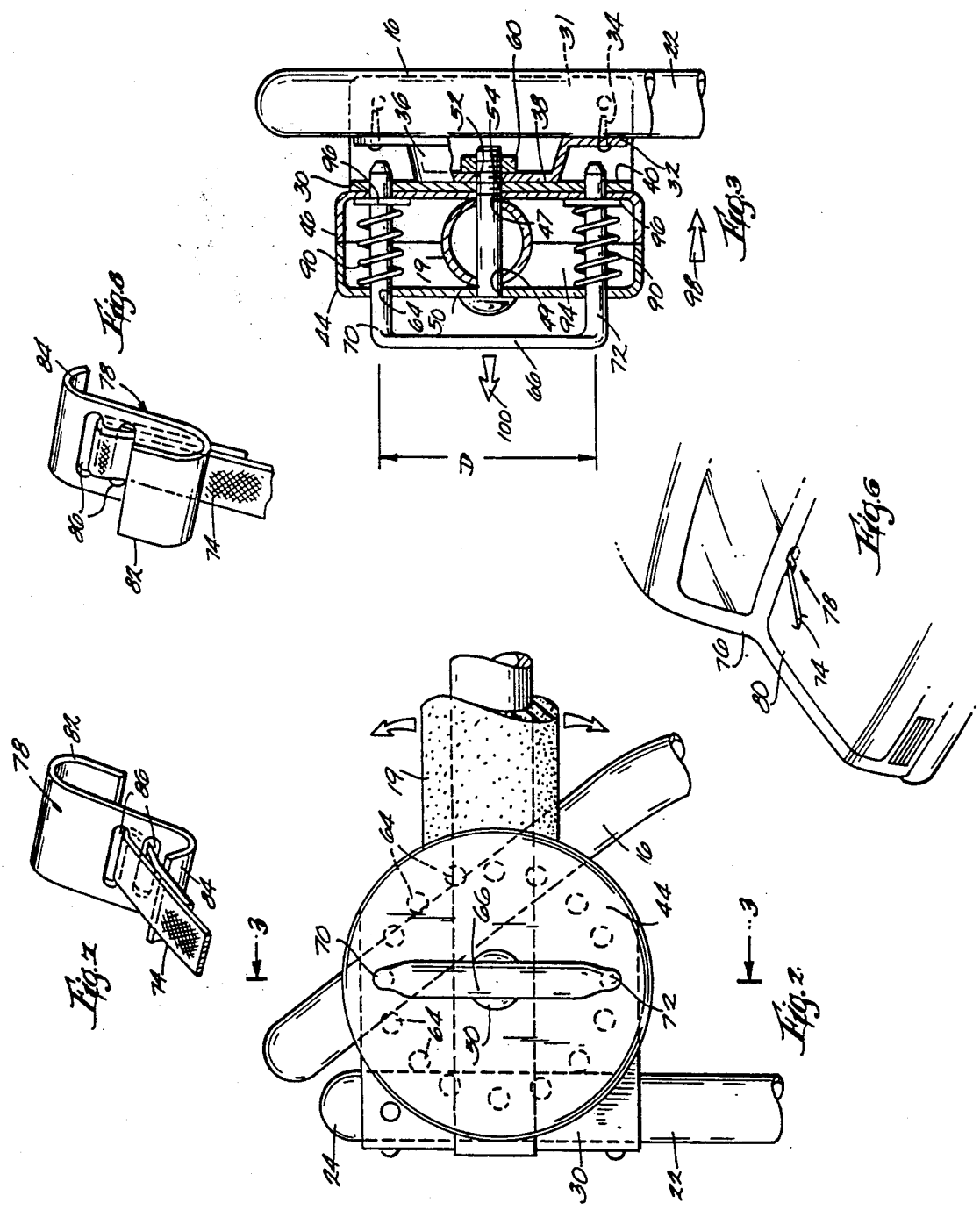

BICYCLE RACK WITH ADJUSTABLE PIN LOCKING

FIELD OF THE INVENTION

The invention relates to bicycle carriers for the rear of a vehicle, and particularly to carriers for supporting the heavier bicycles which have become available recently, such as mountain bikes.

BACKGROUND OF THE INVENTION

Various accessory bicycle racks have been developed U.S. Pat. Nos. 4,394,948; 4,513,897; 4,452,385; 4,830250; 4,452,385; 4,085,874; 4,182,467 and 3,710,999 are examples of prior art patents on bicycle racks. All of these patents have at least two support frames with each support frame made up of two legs. The structure disclosed in the '385 patent has front and rear legs in a fixed relationship, whereas the other patents mentioned above have some range of angular adjustment between the legs to accommodate different shaped trunks or rear extremities of the vehicles.

The '897 and '948 patents show carriers which have forward legs affixed to side plates. Rear legs which engage the rearmost portion of the vehicle have a range of angular adjustment provided by slots in the plates and rivets in the legs which move in the slots.

U.S. Pat. No. 4,830,250 discloses the use of two U-shaped support frames and two support arms all of which are rotatably supported from a common axis and all of which can be adjusted at the same time when the locking nuts are loose. Although the carrier disclosed in the '250 patent provides a compact folded package, it is difficult to manipulate both the legs and the support arms because all parts are loose at the same time. The legs are not locked in a fixed relationship when adjusting the angle of the support arms to horizontal and the legs can easily slip from the adjusted position.

Various of these patents, such as U.S. Pat. Nos. 4,394,948 and 4,452,385, use a row of apertures and threaded fasteners to adjust the relative positions of the swing arms.

Generally these bicycle rack patents show hooks, at the ends of straps, for attaching the racks to vehicles. Each of these hooks, though, is of a singular design, those hooks being sewn to the ends of the straps preventing use of a different design if necessary. There is demand for additional flexibility in hook design to accommodate differences in the vehicles to which the racks are attached.

This invention relates to improvements to the bicycle carriers set forth above and to solutions to some of the problems raised or not solved thereby.

SUMMARY OF THE INVENTION

The invention provides a heavy duty bicycle rack which has angle adjustable support legs. Adjustment of the support arms does not involve or require simultaneous adjustment of the legs which support the carrier on the vehicle.

The present invention provides a heavy duty positive locking mechanism in which locking pin ends are biased into a locking position, thereby selecting the angular position for the bicycle support arms relative to the legs. The locking pins are the ends of handles which can be pulled or withdrawn slightly to release the pins from the locking apertures to afford rotary movement of the support arms. The handles with the locking pin ends are supported in clam shell or cup shaped shells, these shells having apertures which permit relative movement of the handles and pin ends. Springs which bias the handles toward the locking position are confined in the cup shaped shells. Bolts secure the shells, support arms and brackets on each of the support frames in assembly. The bolts are provided with locking nuts and no tension adjustment is required to adjust the angle of the support frames to fit the vehicle. The adjustment of the angle of the support arms to level the support arms to an appropriate horizontal position does not require tightening or loosening any bolts or nuts as in prior art devices. Thus the support arm angle adjustment means of the present invention is safer and more positive, and does not require any periodic testing to ensure that the parts holding the support arms are secured at the appropriate and desired angle. Conventional straps are employed to hold the support frames at the selected position on the vehicle. The hooks at the ends of the straps are sewn to the straps, and may be reversible without removal from the straps.

Further objects, advantages and features of the invention will become apparent from the disclosure which follows.

DESCRIPTION OF THE DRAWING

FIG. 1 is a perspective view of an accessory carrier frame which embodies the support arm locking mechanism of the invention.

FIG. 2 is a side elevational view, on an enlarged scale, of the locking mechanism shown in FIG. 1.

FIG. 3 is a sectional view taken generally along line 3—3 of FIG. 2.

FIG. 4 is a front elevational view of an apertured locking plate constructed according to the invention.

FIG. 5 is a side elevational view of the apertured locking plate constructed according to the invention.

FIG. 6 is a perspective view of a vehicle to which a strap is attached by means of a hook constructed according to a preferred embodiment of the invention FIG. 7 is a perspective view, on an enlarged scale, of a hook and strap constructed according to a preferred embodiment of the invention.

FIG. 8 is a perspective view, on the same scale as shown in FIG. 7, of the hook and strap shown there, although in the opposite position.

DESCRIPTION OF A PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring now to FIG. 1, there are shown two support frames 10, 12. Frame 10 has a pair of frame legs 14 and 16 which are connected at their distal ends by a lower cross member 18. Frame 12 has legs 20 and 22 which are connected at their proximal ends by upper cross member 24 and at their distal ends by lower cross member 26.

Means 28 are provided for connecting each side of the support frames 10, 12 together to afford angular adjustment to space the frames as required for convenient mounting on the vehicle, as shown in more detail in FIGS. 2 through 5. In the disclosed construction the means 28 for connecting the support frames comprises a first bracket 30 and a second bracket 32. Each first bracket 30 has a flange 31 which can be riveted, welded or otherwise secured to a respective one of the legs 20 and 22 (FIG. 1). Correspondingly each second bracket 32 is bolted, or riveted by rivets 34, to the respective one of the legs 14 and 16. The second bracket 32 is provided with a frusto-conical boss or protrusion 36. The top surface 38 of this protrusion provides a bearing surface maintained in frictional engagement with an opposed bearing surface 40 on bracket 30. By this structure is afforded the angular adjustment of the support frames 10, 12.

In accordance with the invention rotary mounting means are provided for permitting rotation and locking of a pair of support arms 19 relative to the support frames 10, 12, to thereby afford rotation and locking of the support arms into any one of a plurality of selected angular positions. In the disclosed construction the locking means includes first and second cup or clam shell members 44 and 46. These members 44, 46 each have a respective central aperture 47 and 49 for receiving a bolt 50. This bolt 50 is of sufficient length so as to extend through both members 44 and 46, and also through an aperture 52 in bracket 32 and an aperture 54 in bracket 30. The bolt 50 is maintained in these apertures 47, 49, 52 and 54 by a locking nut 60, so as to maintain the frictional engagement between bearing surfaces 38 and 40 referred to above, and to ensure that the frames 10, 12 and support arms 19 are supported in assembly and the frames are permitted to be angularly adjusted The locking means also comprises a row of apertures 64 which are formed in bracket 30 and arranged on a circular line concentric with the center aperture 54, the location of the pivotal axis afforded by the bolt 50. The locking means also includes a handle 66 with leg or pin portions 70 and 72 which are spaced as shown in FIG. 2 at the appropriate distance D to register with opposite apertures 64. When the legs 70 and 72 are registered and engaged in the apertures 64 in the plate 30, the legs 70, 72 prevent rotation of the support arm 19 relative to the bracket 30. The bracket 30 is provided with a brace portion 31 which is fixed to the frame leg 20 or 22 to prevent rotation of the bracket 30 as previously described. Thus, the handle 66 and locking legs 70, 72 fix the relationship between support frame 12 and the support arms 19, and prevent any inadvertent swinging or change of angular position of the support arms during use.

Means are provided for biasing handle ends 70, 72 into or toward engagement with the apertured plate 30. In the disclosed construction this biasing means comprises compression springs 90 which are arranged around the handle ends 70 and 72 and are confined within the cavity 94 provided by the clam shell halves 44 and 46. Each handle end 70, 72 is provided with a groove and snap ring 96, or other abutment means, against which one end of the respective spring 90 bears, to urge the ends 70, 72 in the direction of arrow 98 in FIG. 3, that is, into the apertures 64.

In use the position of each support arm 19 can be changed, without regard for the position of the other, by withdrawing the handle 66, and thus the ends 70, 72 from the aperture plate 30, as shown by the direction of arrow 100. This permits free rotation of the support arm 19 relative to the frame 12 to obtain the selected angular orientation of the support arm. Most commonly this desired position will generally be in a substantially horizontal position as shown in FIG. 1, or a folded position when in storage.

As shown in FIGS. 6, 7 and 8, suitable straps 74 are attached for fastening the frames 10 and 12 to a vehicle 76 by means of hooks 78, which engage any suitable portion of the vehicle such as the trunk lid 80. In order to provide the greatest degree of flexibility and security of attachment, the hooks 78 are actually S-shaped, and are formed with two hook ends 82 and 84, each of which is capable of being hooked onto the trunk lid 80. Of course, the two ends 82 and 84 have different curvatures, one larger than the other, to accommodate different sizes of trunk lids or other parts to which the rack could be attached. For each hook 78, the respective strap 74 is looped through two slots 86 and sewn back onto itself to achieve a permanent attachment. The loop of strap 74 created thereby is loose enough to permit free rotation of the hook between the two positions shown in FIGS. 7 and 8, thereby permitting use of the rack on different sizes of trunk lids and other parts without the necessity of providing different hooks or a means to open the loops to attach different hooks.

We claim:

1. An accessory carrier for a motor vehicle comprising:
   a pair of support frames having legs for engaging the motor vehicle and supporting the carrier on the motor vehicle;
   connecting means for connecting said support frames together;
   a pair of support arms for supporting a load remote from the vehicle;
   rotary mounting means for connecting each of said support arms to said support frames, said rotary mounting means affording rotation each of said support arms into any one of a plurality of selectable angular positions about a rotational axis provided by a bolt assembly supported on said support frames;
   said rotary mounting means including a first bracket fixed to one of said support frames, a bolt within said bolt assembly being supported on said bracket and projecting laterally outwardly, apertures in said support arms for receiving said bolt and for supporting said arm for rotary movement about said bolt to the selected angular position; and
   manually operable locking means for locking the support arms in and releasing the support arms from the selected angular position, said locking means comprising:
   a generally U-shaped handle having projecting ends;
   plate means fixed to one of said support arms and provided with a plurality of circumferentially spaced locking apertures arranged to simultaneously receive said projecting ends of said handle in two of said apertures to define one of the angular positions of the support arms; and
   means for supporting and biasing the locking handle into a locking position with the handle ends engaged in the locking apertures to hold the support arm in the selected angular position;
   said handle being withdrawable against the bias to free the handle ends from the locking apertures to change the angular position of the support arms.

2. An accessory carrier in accordance with claim 1:

wherein said means for supporting the locking handle comprises first and second cup shaped housings having peripheral notches to receive the support arms, and central apertures to receive said bolt which secures said cup shaped housings together, said housings having opposed spaced faces and spaced apertures in said faces to receive and support the ends of said handle to provide locking and releasing movement of said handle; and wherein said biasing means comprises compression springs arranged around said handle ends, and abutment means on said handle ends to provide abutment for one end of the springs, with the other end of the springs being confined by one of the cup shaped housings.

3. An accessory carrier in accordance with claim 2 wherein said plate means with locking apertures has a flange for fastening said plate means to one of said support frames and for forming part of the connecting means for connecting said support frames together, said bolt assembly holding said apertured plate means in abutting contact with one of said cup shaped members, said one of said cup shaped members having apertures which are registerable with said locking apertures in said plate means.

4. An accessory carrier in accordance with claim 3 wherein said means for connecting said support frames includes said first bracket, said first bracket having a bearing surface projecting toward said plate means and engaging said plate means within the circumference line upon which said locking apertures are arranged, to afford smooth relative movement of the support frames relative to each other.

5. An accessory carrier in accordance with claim 1 further comprising one or more straps, each strap terminating in a hook, for attaching said carrier to said motor vehicle, each said hook having the strap rotatably attached to the substantial center thereof and being S-shaped, so as to permit either end of said hook to engage the vehicle.

6. An accessory carrier for a motor vehicle comprising:
a pair of support frames;
means for attaching the support frames for adjusting the angular movement, and providing first and second junctions for said support frames;
a pair of support arms;
rotary means for attaching one of the support arms to said frames at each of said junctions, for adjusting the angle of the support arms;
a pair of cup shaped members for each support frame junction and an apertured plate for each junction;
said means for attaching said support frames comprising a bracket at each said junction fixed to one of said support frames and a bolt for each said junction extending through apertures in said cup shaped members, a respective one of said support arms, said apertured plate and said bracket, to hold said parts in assembly and afford relative movement between the support frames and relative movement between said cups and said plate during swing movement of said one of said support arms to a selected angular position; and
locking handles having ends supported in apertures in said cup shaped members for movement into and from locking engagement with apertures in said apertured plate.

7. An accessory carrier for a motor vehicle comprising:
a pair of support frames for supporting the carrier on a motor vehicle;
means connecting said support frames together;
a pair of support arms for supporting a load remote from the vehicle;
rotary mounting means for connecting each of said support arms to said support frames for permitting rotation of the support arms into any one of a plurality of selected angular positions about a rotational axis provided by a bolt, said rotary mounting means comprising:
a bracket fixed to one of said support frames, said bolt supported on said bracket and projecting laterally outwardly,
apertures in each said support arm for receiving said bolt and supporting said arm for rotary movement about said bolt to a selected position, and
manually operable locking means for adjusting the angular position of the support arm and locking the support arm in said selected position, said locking means comprising a generally U-shaped handle having projecting ends, plate means on said support arm provided with a plurality of locking apertures spaced on said plate and circumferentially arranged to similarly receive both ends of said handle in two of said apertures to define one of the angular positions, and means for supporting the handle and biasing the handle into a locking position to afford swinging of said support arm between locking positions when said handle is withdrawn against the bias to free the handle ends from the locking apertures.

8. Rotary mounting apparatus for mounting a support arm to a pair of support frames, permitting rotation and locking of the support arm into one of a plurality of selected angular positions about a rotational axis with respect to said frames, comprising:
a bracket fixed to one of said support frames, a bolt supported on said bracket and projecting laterally outwardly;
apertures in said support arm for receiving said bolt and supporting said arm for rotary movement about said bolt; and
manually operable locking means for adjusting the angular position of the support arm and locking the support arm in a selected position, said locking means comprising:
a generally U-shaped handle having projecting ends;
plate means on said support arm provided with a plurality of locking apertures spaced on said plate and circumferentially arranged to similarly receive both ends of said handle in two of said apertures to define one of the angular positions; and
means for supporting the handle and biasing the handle into a locking position to afford swinging of said support arm between locking positions when said handle is withdrawn against the bias to free the handle ends from the locking apertures.

9. A hook for use in attaching a carrying accessory to a vehicle by being attached to a strap and engaging a suitable portion of the vehicle, said hook being formed from a single flat member and formed into an S-shape, and having two hook ends, each of said ends having different curvatures, one larger than the other, said strap being looped through two slots centrally formed in said hook and attached back onto itself and being loose enough to permit free rotation of the hook between two positions, one in which one hook end is engaged with the vehicle and the other in which the opposite hook end is engaged with the vehicle.

* * * * *